Dec. 17, 1940.  T. J. ANDERS  2,225,027
STRAINER FOR COFFEE MAKERS
Filed Dec. 12, 1938
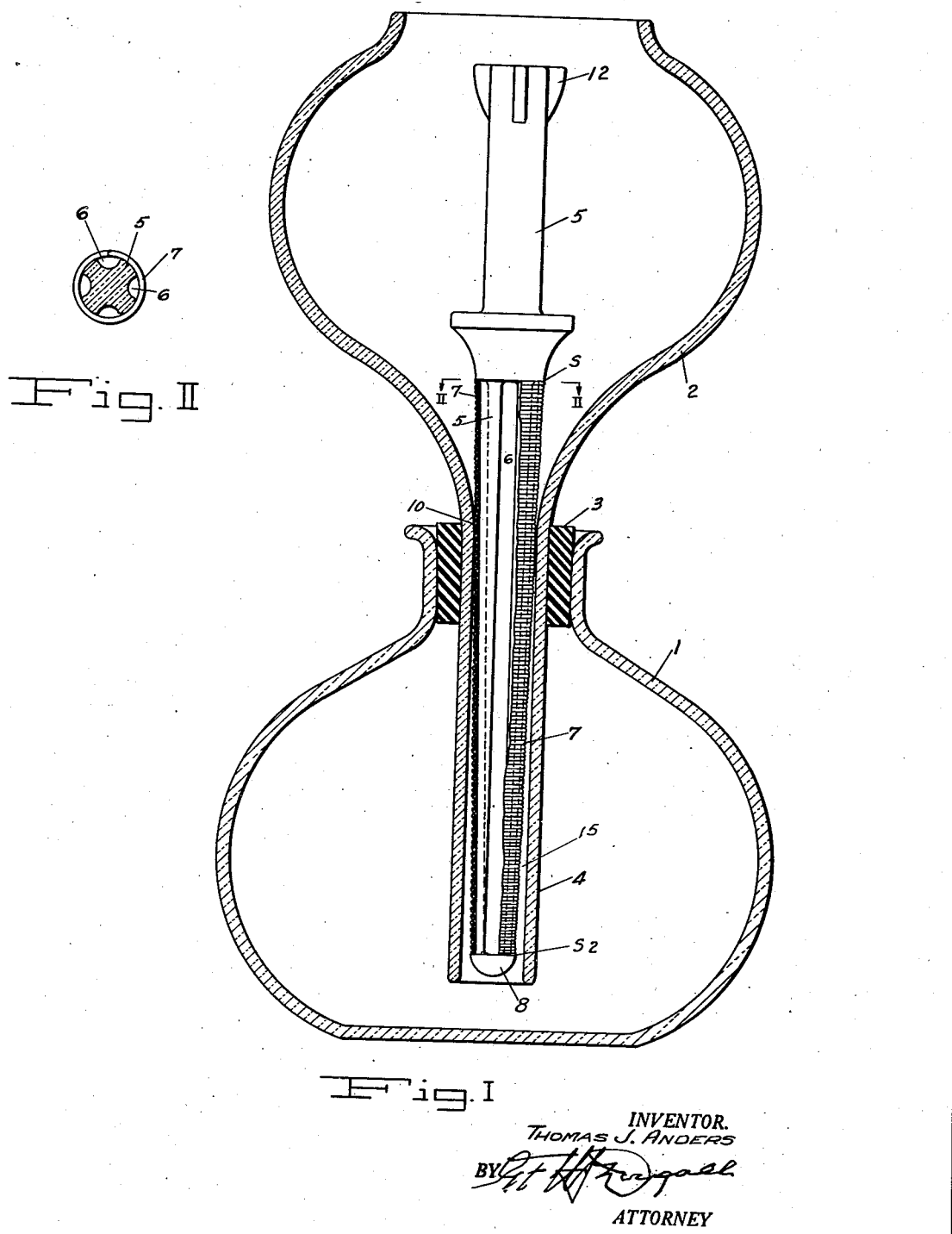
INVENTOR.
THOMAS J. ANDERS
BY
ATTORNEY Patented Dec. 17, 1940

2,225,027

UNITED STATES PATENT OFFICE 2,225,027

STRAINER FOR COFFEE MAKERS

Thomas J. Anders, Portland, Oreg.

Application December 12, 1938, Serial No. 245,210

4 Claims. (Cl. 210—162)

This invention relates to an improved strainer for the well known glass coffee makers having a lower vessel in which water is heated and then forced by steam pressure into a vessel hermetically sealed in superposition and containing ground coffee, where the brewing takes place. From thence the liquid coffee returns again to the lower vessel, when the same is removed from the fire and a drop in temperature causes the steam to condense. To make clear "coffee" the liquid must be strained.

Generally the straining is done through a piece of fabric, which requires frequent renewal; and various other expedients have been used.

The criterion to be met is a strainer that is effective, easily cleaned and does not require renewal except in case of damage that cannot occur during use, and it is an object of this invention to meet the conditions stated.

Another object is a strainer device that is little subject to accumulating the brown deposit common to all coffee making devices, which has a tendency to flavor newly made coffee with the rancid taste of other brews of days before.

I accomplish the objects stated and others that will be apparent, by the structure illustrated in the accompanying drawing and described in this specification, the novel features of which are particularly pointed out in the claims that follow.

In the drawing—

Fig. I is a view of the preferred embodiment of my invention, shown in connection with a conventional glass coffee maker hereinbefore referred to, the delineation of the coffee maker bodies being diagrammatic;

Fig. II is a section on the line II—II of Fig. I.

Further describing the drawing, I is the pressure vessel portion of the coffee maker and 2 is the brewing vessel, hermetically sealed to the pressure vessel by the annular rubber seal 3.

4 is the essential siphon tube which may be made a part of the brewing vessel 2 or made separate and attached in any preferred manner. Tubes such as 4 are customarily made cylindrical with an inner diameter of about 1¼ of an inch, more or less. So far as this description has here progressed, the structure is broadly old and is no part of the present invention, though the invention is intended to cooperate with the old structure to produce an improved result.

First I make a rod member 5 that is preferably tapered uniformly from the point marked S, which indicates an abrupt shoulder, to the point marked S2, which is an oppositely facing shoulder of smaller diameter. I prefer to place longitudinal grooves such as 6 in the tapered portion of the rod 5 that are longitudinally coextensive with the tapered portion, since the coil spring 7, shown partially sectioned in Fig. I and in full cross section in Fig. II will have a better support.

The coil spring 7 is a close wound coil made from stainless steel, silver plated wire or other suitable metal and is of such overall length that when compressed and placed in position between the shoulders S and S2, the several lays will be substantially in contact. The spring must be resilient enough so that it will snap over the bulb 8 onto the shoulder S2. It is likewise tapered to make a neat fit on the external tapered portion of the rod 5, being of such outside diameter that it will come to rest in the tube 4, leaving a substantial portion of its upper length exposed, such as that portion below the line II—II and extending to the point 10 where its external surface frictionally contacts the inside of the tube 4. The rod 5 may be made of annealed glass or other suitable material.

The mode of operation of this structure is at once clear.

Liquid, such as water, being forced upward towards the brewing vessel 2 by steam pressure generated in the pressure vessel 1, starts up the tube 4, being forced between the coils of the spring 7 and into the grooves 6. When it reaches a point above the point 10, it flows outwardly again, through the upper exposed part of the spring 7, through the coils where it mixes with the ground coffee that will have been placed in the brewing vessel 2.

When the pressure vessel is removed from the source of heat and the pressure therein falls below the boiling point, gravity usually assisted by a developed vacuum condition in the pressure vessel 1 causes the brewed coffee liquid to reverse the direction of flow.

The liquid enters between the coils in the upper exposed portion of the spring 7 to the grooves 6 and downward to the pressure vessel 1 and must needs pass outwardly between the lower coils of the spring 7; hence the liquid coffee is strained twice through the spring.

It is not always necessary to make the spring long enough for double straining and I do not wish to limit myself to this construction because the upper portion of the spring in the brewing chamber will alone do good work, especially if the ground coffee is not too fine.

I prefer to make the rod 5 long enough so that it may be readily grasped by the fingers for convenience in placing and removing, as shown, and a hand-hold 12 will be found convenient.

When it is desired to remove the spring for cleaning, a downward pressure combined with a twisting movement in direction opposite to the lay of the coil spring 7 readily removes it with practically a single motion. The proportions may be varied within considerable limits if it be borne in mind that some exposure of the spring above where it contacts the inside of the tube 4, is essential for free operation and of course a portion where the liquid coffee can escape, such as the tapered annular space 15, as shown. If the lower portion of the spring is omitted, the grooves 6 will be co-extensive with the lower part of 5.

What I claim as new and desire to secure by Letters Patent is—

1. In a strainer for a coffee maker comprising upper and lower vessels, a cylindrical siphon tube, a tapered metal coil with a median diameter that fits inside the upper end of the tube, a rod in said coil and means on said rod for engaging said coil in close cooperative engagement to substantially close both ends thereof, the said rod being formed to provide a liquid space intermediate the ends of the coil when mounted, whereby liquid is first strained in through the upper portion of the coil and then out through the lower portion of the coil.

2. A strainer device for a coffee maker of the class described including two separable vessels, one of which is superposed on the other with a cylindrical siphon tube therebetween, comprising a supporting rod, a removable tapered metal coil that covers a substantial portion of the rod, means for frictionally maintaining the coil in position on the rod with both ends of said coil substantially filled by the rod, and a median fluid passage between the rod and the coil, the external diameter of the coil being such that it may be placed only part of its length into the siphon tube to leave an exposed portion of the coil in the said superposed chamber.

3. A strainer for a relatively cylindrical siphon tube, comprising a tapered rod member, a tapered coil mounted on said rod member to provide a fluid space between the rod and coil, and shoulders on the rod member for retaining the coil and substantially closing both of its ends, the outside diameter of said coil being so proportioned that it is insertable only a part of its length into the siphon tube to leave an upper exposed part as a strainer and a lower portion within the tube to restrain the fluid back into the tube.

4. A strainer for a coffee maker comprising a lower vessel, a superposed vessel and a siphon tube therebetween, comprising a close laid tapered metal coil insertable into the siphon tube to partially project into the upper vessel, a tapered rod inside the coil and shoulders on said rod positioned to substantially close both ends of said coil, said rod being so formed intermediate the shoulders that a substantial portion of the intermediate portion of the rod is out of contact with the coil whereby fluid from the upper vessel first flows into the space between the coil and rod which extends into the upper vessel and afterwards flows into the lower portion of the siphon tube through the lower portion of the coil.

THOMAS J. ANDERS.